April 23, 1968    R. M. DECKER ET AL    3,379,966
APPARATUS FOR THE MEASUREMENT OF PLATEAU
SLOPE OF GEIGER-MULLER TUBES
Filed Nov. 3, 1964                                      4 Sheets-Sheet 1

INVENTORS.
ROBERT M. DECKER
ROBERT JEHLE
SELAM K. VEISEL
BY
Ernest J Weinberger
ATTORNEYS INVENTORS.
ROBERT M. DECKER
ROBERT JEHLE
SELAM K. VEISEL
BY
Ernest J Weinberger
ATTORNEYS

United States Patent Office 3,379,966
Patented Apr. 23, 1968

3,379,966
APPARATUS FOR THE MEASUREMENT OF PLATEAU SLOPE OF GEIGER-MÜLLER TUBES
Robert M. Decker, West Hempstead, Robert Jehle, Jackson Heights, and Selam K. Veisel, Brooklyn, N.Y., assignors to the United States of America as represented by the Secretary of the Navy
Filed Nov. 3, 1964, Ser. No. 408,705
4 Claims. (Cl. 324—24)

ABSTRACT OF THE DISCLOSURE

An apparatus for plateau slope measurement of G-M tubes which includes a source of radioactive radiation directed toward a G-M tube to which is applied a selective high potential. The output pulses of said tube are applied to a pulse shaper and then divided down before application to a counter circuit and a readout indicator. The frequency counter is provided with a combination of resistors which alter the time constant thereof and when the switch for these resistors is coupled or coacted with the selectale tube potential for two values, the output indicator will show directly whether the G-M tube is operating (slope) properly and is within any desired specification limits.

---

The invention described herein may be manufactured and used by or for the Government of the United States of America for governmental purposes without the payment of any royalties thereon or therefor.

This invention relates in general to the testing and evaluation of radiac tubes and in particular to the direct measurement of the plateau slope of such tubes.

The configuration of a radiac or Geiger-Müller tube takes the form of a hollow closed metallic cylinder having a coaxial wire anode therein. The tube is in general filled with a readily ionizable gas and a relatively high potential is applied between the anode and the metallic casing or cathode. Radioactive particles entering the tube cause ionization of the gas and the resultant ions and electrons migrate and flow to the anode and cathode respectively so as to produce therebetween a current pulse. If one considers a constant number of particles entering the tube in a unit time or at a known rate then the number of pulse counts or ionizations should be dependent on the potential between the tube electrodes. This however is not entirely correct since in general, a minimum potential is necessary to produce some ionization and until such threshold potential is attained little effect can be discerned by increasing the potential. When the threshold potential is reached a small increase in potential is accompanied by a large or marked increase in the number of pulse counts. This relationship continues until some particular potential, after which only an extremely small variation in pulse count results from a large potential excursion. This area or range of minimal count change is referred to as the "plateau region." This region may well cover several hundred volts and its upper potential is characterized by a most rapid increase in count with an accompanying inter-electrode glow and corona discharge. These types of discharges considerably diminish useful tube life as well as inflict permanent damage thereto resulting in unpredictable and unstable tube characteristics.

For each G-M tube manufactured, the slope of the plateau region should conform to certain limits before the tube is placed in service. One common method of obtaining this slope is to expose the tube to a fixed source of radioactive radiation while concurrently increasing the anode potential in a series of discrete increments. For each potential the pulse counts per unit time of the tube are recorded. The counts are then plotted against the potential and the slope of the resulting plot is a measure of the linearity of the tube response with respect to voltage variation. This method is at best laborious and time consuming and can, to some extent, be shortened by the use of reference charts and a lesser number of individual measurements. In either case however, the services of a trained and experienced technician are required to operate the necessary test equipment and to interpret the results.

Another factor which directly affects the evaluation of plateau slope is the fact that all radioactivity is random by nature and therefore the pulse count rate fluctuates so that the actual reading of the output meter is inaccurate. Previous designs, in order to overcome this difficulty, relied on a heavily damped meter and on circuits attempting to subtract two random count rates. Both proved unfeasible.

In view of the foregoing it is an object of this invention to provide a direct, inexpensive and direct reading apparatus for the measurement of the plateau slope of radiac tubes.

A further object of this invention is to provide an apparatus for rapidly and accurately ascertaining critical characteristics of a G-M tube and which apparatus can be operated by unskilled personnel.

Other objects and advantages will appear from the following description of an example of the invention, and the novel features will be particularly pointed out in the appended claims.

Figure 1:
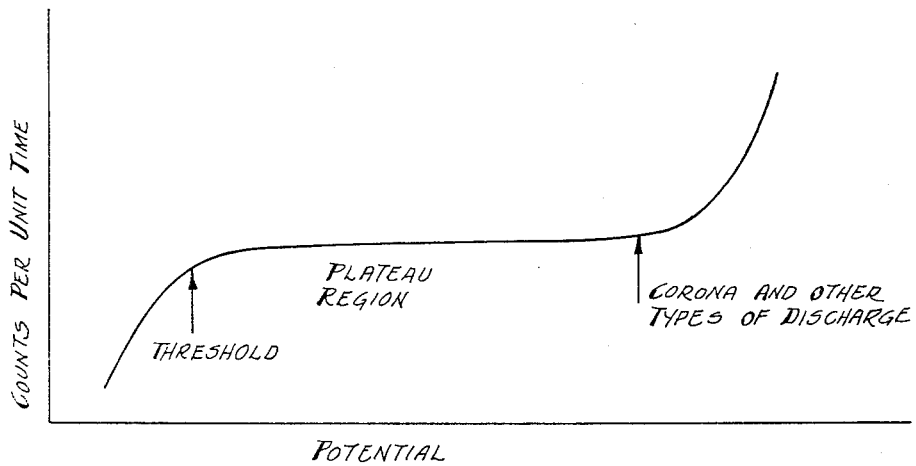
FIG. 1 is a typical plot of counts per time vs. anode potential for a G-M tube while exposed to a constant source of radioactive radiation.

The count rate characteristic of a typical G-M tube is illustrated in the graph of FIG. 1. Here is shown a plot of counts (pulses) per unit time or count rate against anode potential. The curve in general indicates that the count rate increases with higher anode potentials. There exists a portion of the curve which although is increasing does so very slowly thereby appearing to create a shallow plateau. This plateau region designates the operating potential of the G-M tube and it is the slope or variation of each tube which determines its suitability and individual characteristic. It is therefore advisable to ascertain the plateau slope of each tube before it is placed in service and reject those tubes whose slopes do not conform with so predetermined limits. As for example, it has been found for certain military requirements that this slope not exceed 15%.

Figure 2:
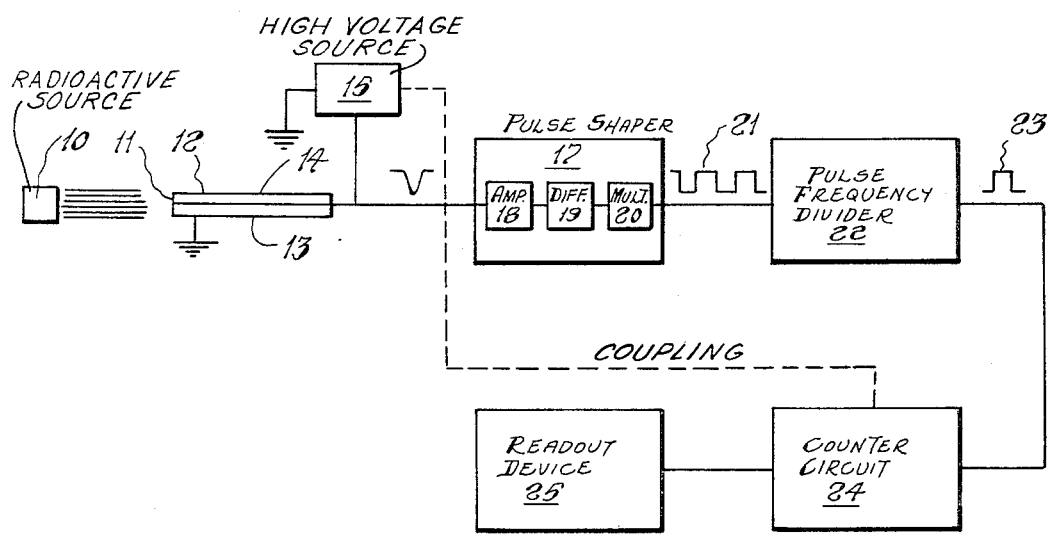
FIG. 2 is a block diagram of circuit blocks arranged in accordance with the principles of this invention.

Measurement of the plateau slope necessitates knowledge of two parameters, the pulse count rate and the applied anode potential. An accurate, stable count rate has not been easily attainable without use of high skilled technical personnel. In order to overcome previous difficulties and to reflect semiautomatic operation the embodiment of FIG. 2 has been fabricated and satisfactorily operated. A constant source 10 of radioactive radiation, such as gamma, is disposed to direct its emission toward the window 11 of a Geiger-Müller tube 12. The tube is a hollow cylinder of a conductive material whose casing 13 is the cathode and coaxial therein is a wire-like anode 14 insulated from the casing 13. The tube is filled with a suitable ionizable gas such as argon and properly quenched. The casing or cathode 13 is grounded and the anode 14 supplied a selectable high D.C. potential from a high voltage source 15.

When radioactive emanation penetrates the window 11 or casing 13 it ionizes some of the argon molecules and the resulting electrons are attracted toward the positive anode while the ions migrate in the direction of the cathode 13. In general although secondary ionization occurs we can for present purposes (in the plateau region) consider one pulse count for each radioactive particle ionization. Therefore when a radioactive emanation enters the G-M tube, a curent pulse flows through the tube and the shape or waveform of this pulse is as illustrated at 16. These pulses occur in a random time series and are applied as the input to pulse shaper 17. The internal configuration of shaper 17 comprises in this example of a paraphase amplifier 18, a differentiator 19 and a one-shot multivibrator 20. The output of the shaper consists of a series of squarewave shapes (21) having a one-to-one time relation to the original input pulses. The random squarewave series is now count divided or frequency divided by divider 22. The divider may take the form of many known circuits which are presently available and include binary multivibrators, mutiple electrode glow counting circuits and counter triggered blocking oscillator. By frequency division the randomness of the pulse is substantially reduced as evidenced by the following analysis:

The most probable duration ($t_0$) of an interval between random pulses is given by $$t_0 = \frac{S-1}{S}\bar{t} \qquad (1)$$

where S is the scaling factor or division and $\bar{t} = S/A$ = average time interval where A is the average rate.

As an example consider an average pulse rate (random) of 400 counts per second and a divisor or scaling factor of 16 then $\bar{t} = 16/400 = 0.04$ second/count.

From equation 1 it is clear that the most probable interval is slightly shorter than $\bar{t}$ or $S/a$. As the scaling factor (S) becomes large $S \approx S-1$ and the most probable duration ($t_0$) equals ($\bar{t}$) which results in perfect stabilization. Where $S = 16$ then $$\frac{S-1}{S} = \frac{15}{16}$$

or 0.94 and $t_0 = 0.94\bar{t}$ indicating 94% stabilization. For $S = 32$ then $t_0 = 0.97\bar{t}$ or 97% stabilization. Clearly in dividing (frequency) by 16 then the randomness is reduced to provide a figure of 94% stabilization while a factor of 32 only increases the stabilization by approximately 3%. The pulse time stabilized output 23 is applied to a counting circuits 24 which might be a frequency counter or an integrator whise output is indicative of the pulse rate being applied thereto. The counter 24 is also provided with a sensitivity or gain control so that a known reduction in gain or sensitivity may be selected. A readout devise 25 such as a voltmeter, recorder etc., which will display and indicate the output level of the counter 24 is connected thereto.

The overall operation encompasses the activation of the G-M tube by the radioactive source so as to produce a random series of pulses directly related to the particles entering the G-M tube. The tube pulses are converted in a one-to-one relation into squarewaves by the shaper and are thereafter divided down so as to provide a more stabilized or regularly time spaced series of pulses which in turn are counted and readout. By adjusting the gain or sensitivity of the counter circuit the limits of the plateau slope of the G-M tube can be directly set and all that is necessary to determine whether the tube characteristics fall with some specified limits is to observe the readout device at a first voltage and then reduce the gain and apply a second higher voltage and ascertain whether the readout indicates a higher reading. A full explanation of this technique follows in the description of the circuit of FIG. 3.

Figure 3A:
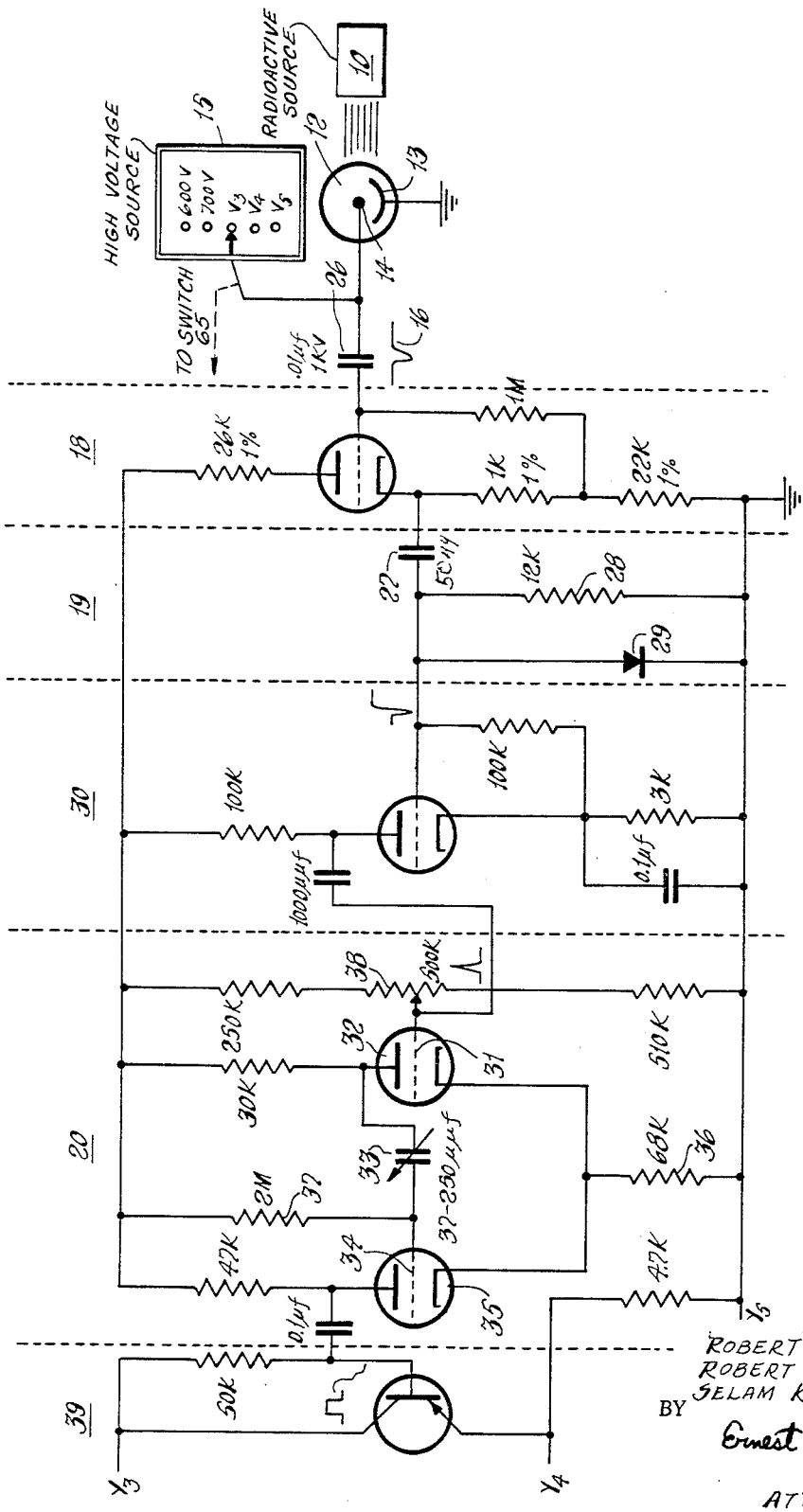
FIGS. 3 (a, b, c) is a schematic drawing of an embodiment made in accordance with the principles of this invention.
Figure 3B:
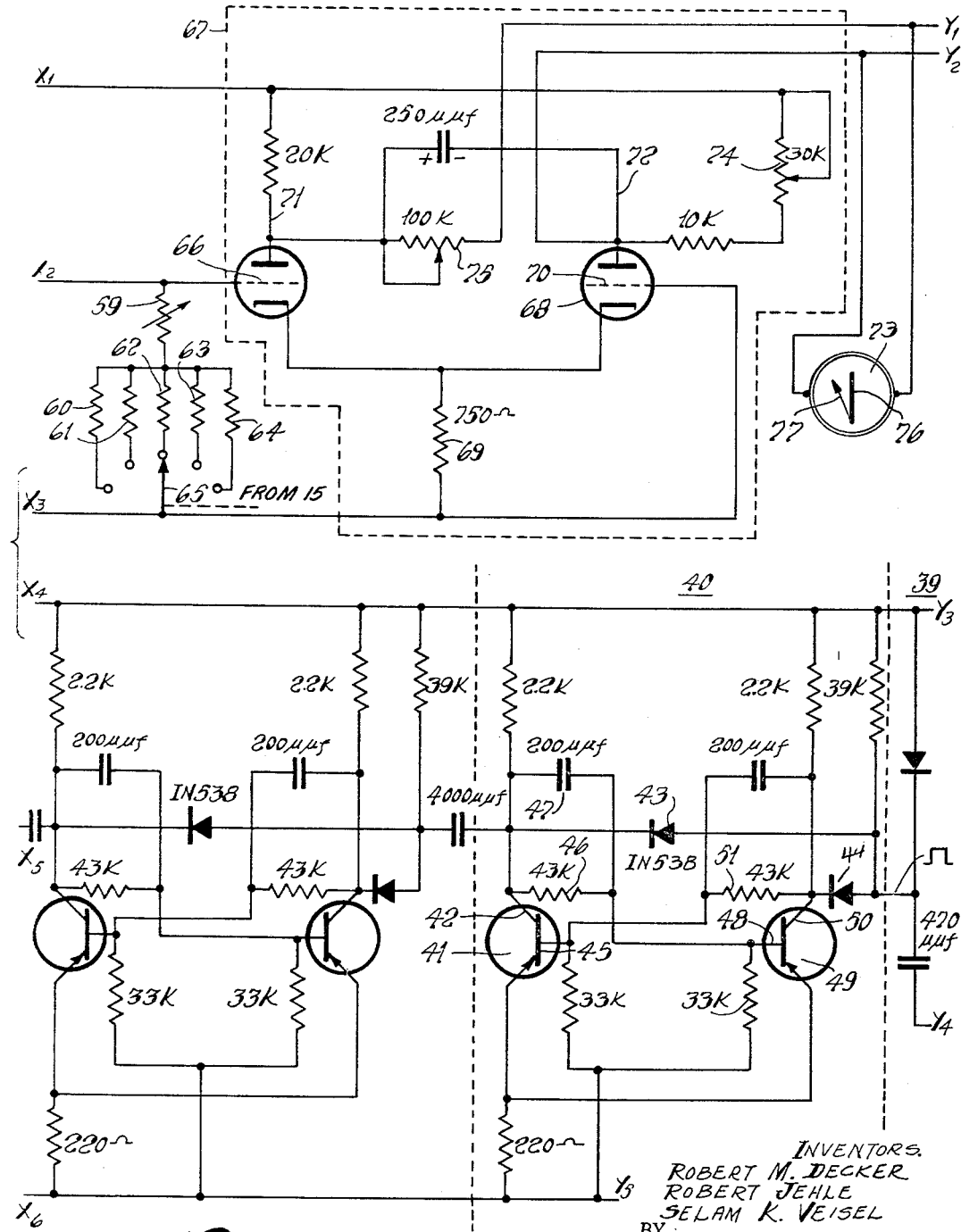
Figure 3C:
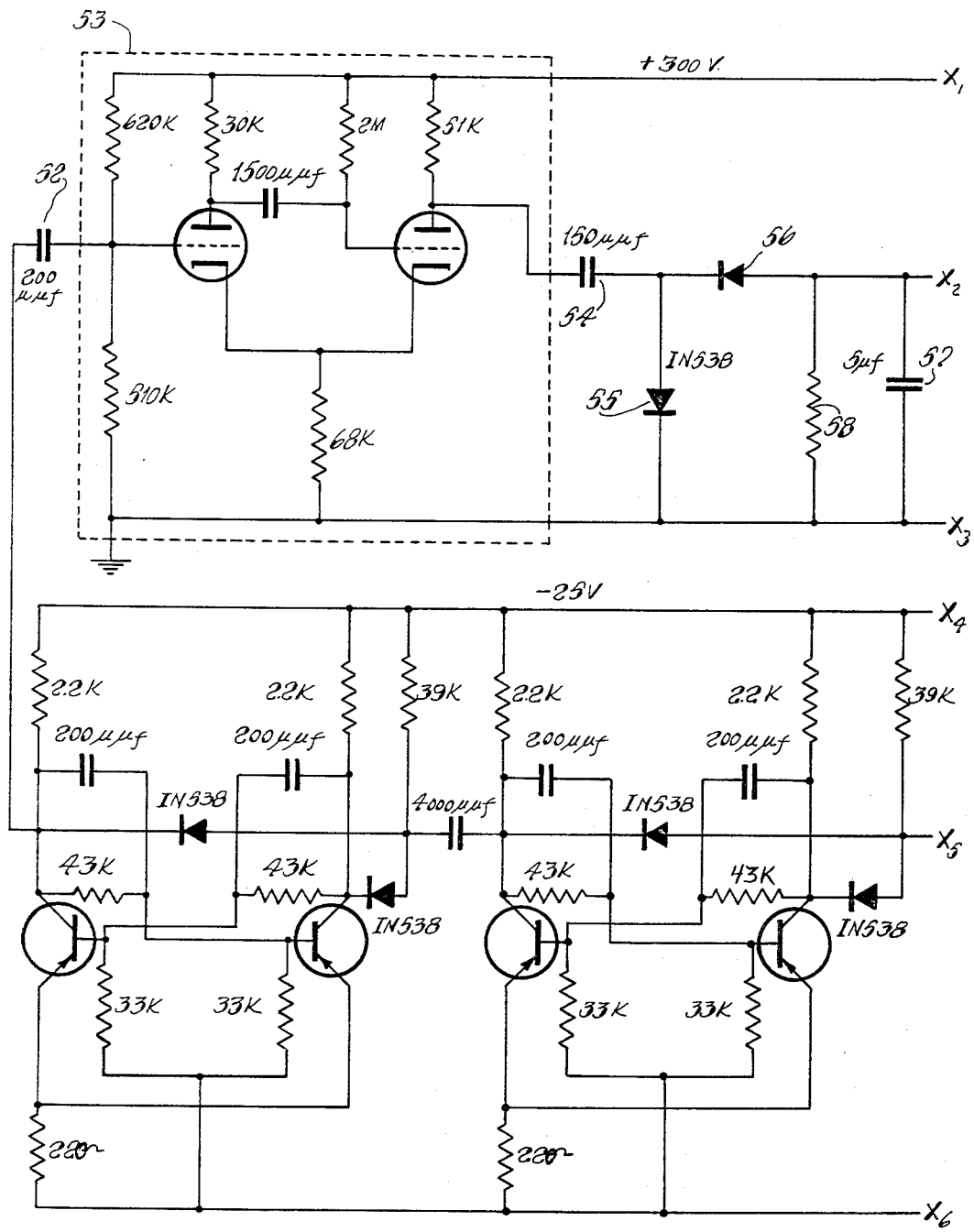

Referring now specifically to FIG. 3 wherein like reference numerals have been used for similar units, a selectable high voltage is applied by way of the potential source 15 to the anode 14 of G-M tube 12 while it is exposed to radioactive radiation from source 10. The output random pulses (10) resulting from ionization within the tube are applied though capacitor 26 which, isolates the high D.C. voltage, from the input to the amplifier 18. Since the output pulses from the G-M tube are random in occurrence and non-uniform in height, it is necessary to average out the randomness as well as to shape each pulse for uniformity. To this end amplifier 18 serves to increase the pulse height of all the pulses to some predetermined minimum value. The cathode output of the amplifier 18 is applied to a differentiating circuit 19 of capacitor 27 and resistor 28 while diode 29 serves to clip the positive going overshoot of the differentiated output pulse. Amplifier stage 30 is employed as an inversion amplifier whereby its output, taken at the plate, will consist of positive going pulses. These pulses are fed into the grid 31 of the "off" side 32 of a one-shot multivibrator 20 which in this case is cathode coupled. The circuit parameters are chosen so that a negative pulse of a certain amplitude, such as one volt or greater, at the grid of amplifier 18, is necessary to turn side 32 "on" or come out of "cut-off," and conduct. This conduction decreases the plate voltage which is coupled through capacitor 33 to the grid 34 of the multivibrator side 35. This starts side 35 in the direction of cut-off with the current therethrough to decrease, resulting in a voltage decrease across cathode resistor 36. As the cathode voltage decreases the current through side 32 increases thereby further lowering the plate on this side which is coupled to side 35 and drives it toward cut-off. This entire action clearly can be considered to take place almost instantaneously. Side 35 will be cut-off and side 34 "on" for approximately 50 microseconds which is the time necessary to allow capacitor 33 to charge sufficiently through resistor 37 to return side 35 to conduction and cut-off side 32 due to the voltage drop across cathode resistor 36 and because grid 31 has become sufficiently negative with respect to its cathode to be in the cut-off region. The discrimination level and the output pulse width for this form of multivibrator are determined by potentiometer 38 and capacitor 33 respectively. The output is essentially a one to one representation of the G-M tube pulses in the form of uniform, random positive squarewave pulses 50 microseconds wide and is fed into an emitter (or cathode) follower stage 39 which serves to match the high impedance of the multivibrator output and the low input impedance of the subsequent binary stage and to provide interstage decoupling.

Although four binary multivibrator stages 40 are shown they are all identical and therefore it is necessary to only describe one of them. In a binary multivibrator one circuit transistor or tube is in the conducting or "on" state while the other is "cutoff." Assuming that transistor 41 is in the conducting state when a positive input pulse is applied to the binary 40. With the transistor 41 conducting its collector 42 potential increases in a positive sense thereby back-biasing steering diode 43. The other steering diode 44 is essentially unbiased and so the incoming positive pulse passes therethrough to the base 45 of transistor 41 where it causes a reduction in the collector-emitter circuit resulting in a drop in collector potential. This fall in collector potential is coupled by way of the parallel RC combination of resistor 46 and capacitor 47 to the base 48 of transistor 49. This action causes transistor 49 to conduct and raises its collector (50) potential. The rise in collector 50 potential is coupled to the base 45 of transistor 41 thus driving this transistor into "cutoff." This action occurs almost instantaneously and due to the direct collector-base couplings by resistors 46 and 51 transistor 41 will remain in the "off" state while transistor 49 will continue to conduct until the arrival of the next input pulse. Since the conditions of the transistors have been reversed, similarly, steering diode 44 is now back-biased while diode 43 is unbiased. Clearly the output of each binary consists of pulses similar to the input but only half in number thus it is essentially a frequency divider. By series connecting four binary stages a 16:1 division is obtained at the output of the last binary and this division results in approximately 94% stabilization as explained hereinbefore.

The output of the last binary is applied by way of capacitor 52 to a typical one-shot multivibrator 53 which serves to increase the pulse height and to provide pulses of uniform shape. The output thereof is applied to a frequency counter which is essentially an RC network and a difference amplifier. The positive pulses emanating from the one-shot multivibrator 53 charge capacitor 54 through diode 55. This capacitor 54 is charged so that the polarity is positive on the plate side and negative at the diode 55. After the input positive pulse disappears capacitor 54 discharges through diode 56 into capacitor 57. The D.C. voltage across capacitor 57 depends on the number of pulses received within the time it takes this capacitor to discharge through resistor 58 and the combination of variable resistor 59 with one of the resistors 60–64 selected by means of switch 65 which may be coupled to the voltage selector switch of potential source 15. These resistors alter the time constant and since they are fixed, although selectable, the D.C. voltage at grid 66 of difference amplifier 67 for any one position of switch 65 depends on the rate of the incoming pulses.

The voltage at grid 66 is reflected to tube 68 by common cathode resistor 69 and with grid 70 of tube 68 grounded the voltage between plates 71 and 72 is proportional to the rate of pulses emanating from the G-M tube 12. The meter 73 is operated in push-pull by connection between the plates of the difference amplifier. Variable resistor 74 is the zero adjustment for the system while resistor 75 is the calibration potentiometer which in general is set for midscale deflection for a selected pulse repetition rate at the input to amplifier 18, as 400 p.p.s. The meter 73 is provided with an additional marking needle 76 which is manually set or controlled.

In operation a particular high voltage from source 15 say 600 volts is applied to the anode of the G-M tube 12 while it is being irradiated by radioactive source 10. Due to the subsequent circuitry of the device and the reduction in randomness a steady deflection is obtained at the meter 73 by way of indicating needle 77. The adjustable marking needle 76 is then set to coincide with the deflected needle reading. This initial reading is made with selector switch in one position which might represent a reference. The voltage applied to the G-M tube is now increased to the maximum value for which the tube is to be employed and at the same time selector switch is changed either manually or by having the switch associated with the potential source 15 and resistor switch 65 mechanically coupled to introduce another resistor which would reduce the meter gain by an amount equal to the specification limit of the plateau slope. As an example, for certain G-M tubes (5979 and 5980) the two voltages are 675 and 725 v. DC while the percentage change is not permitted to exceed 15%. The application of the higher voltage (725 v.) will either cause no change in the G-M tube count rate at the meter 73 or it will increase the count rate by some amount. If the rate count is unaffected by the higher potential the meter indicating needle will be deflected down scale from the initial reading, due to the decrease in sensitivity or gain. If the count rate increases the needle may drop slightly, remain at the initial position or increase beyond the marking needle. How the needle responds depends on how much the count rate has changed due to the increased applied potential at the G-M tube. It can be readily observed that if the needle deflects above the marking needle indicator, then the count rate must have increased beyond the allowable limit as determined by the resistor introduced by selector switch 65. In other words if the deflection exceeds the mark, the tube does not come within the specification value chosen and the operator need only observe such fact and need not interpret or make any calculation all this being with a high degree of accuracy.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

1. A device for accurately and directly ascertaining the plateau slope of a G-M tube having an anode and cathode electrode when said tube is exposed to the radiation from a radioactive source which comprises:

a source of selectable high potentials connected across the electrodes of said tube, pulse shaping and forming means for generating in a one to one relation a series of random square-wave pulses from the random pulses generated in said tube, said pulse means being connected to receive said pulses from said tube, a series of binary circuits for generating one output pulse for a plurality of input pulses, having an input and output terminal, said input terminal being connected to the output of said pulse shaping means, an integrator circuit including a capacitance and a variable resistance in parallel with said capacitance whereby the count rate may be altered by said variable resistance for producing an output voltage dependent on the input pulse rate, said integrator circuit being connected to receive the output of said series of binary circuits, a readout means for ascertaining and indicating the voltage output of said counting means and switch means coupled to both said source and said variable resistance for automatically altering the rate count dependent on the high potential applied to said G-M tube, whereby two selectable high potentials may be successively applied to said G-M tube and the resultant indications of said readout means will be a measure of the plateau slope of said tube.

2. The device according to claim 1, wherein said readout device includes:

a difference amplifier and a voltmeter connected to said difference amplifier, said voltmeter having an adjustable pointer and a voltage deflecting pointer, whereby comparison can be made directly between successive deflections of said voltmeter.

3. A device for accurately and directly ascertaining the plateau slope of a G-M tube having an anode and cathode electrode when said tube is exposed to the radiation from a radioactive source which comprises:

a source of selectable high potentials connected across the electrodes of said tube, pulse shaping and forming means for generating in a one to one relation a series of random square-wave pulses from the random pulses generated in said tube, said pulse means being connected to receive said pulses from said tube, a series of binary circuits for generatnig one output pulse for a plurality of input pulses, having an input and output terminal, said input terminal being connected to the output of said pulse shaping means, an integrator circuit including a capacitance and a variable resistance in parallel with said capacitance whereby the count rate may be altered by said variable resistance for producing an output voltage dependent on the input pulse rate, said integrator circuit being connected to receive the output of said series of binary circuits, a readout means for ascertaining and indicating the voltage output of said counting means and switch means for both said source and said variable resistance for altering the rate count in conjunction with the high potential applied to said G-M tube, whereby two selectable high potentials may be successively applied to said G-M tube and the resultant indications of said readout means will be a measure of the plateau slope of said tube.

4. The device according to claim 3, wherein said readout device includes:

a difference amplifier and a voltmeter connected to said difference amplifier, said voltmeter having an adjustable pointer and a voltage deflecting pointer, whereby comparison can be made directly between successive deflections of said voltmeter.

References Cited

UNITED STATES PATENTS

| | | | |
|---|---|---|---|
| 2,666,890 | 1/1954 | Voll | 324—24 |
| 2,876,360 | 3/1959 | Victoreen | 250—83 X |
| 3,184,606 | 5/1965 | Ovenden. | |
| 3,271,572 | 9/1966 | Lieber | 250—83 X |

OTHER REFERENCES

Review of Scientific Instruments (Lifschutz et al.), vol. 9, March 1938, pp. 83–89.

RUDOLPH V. ROLINEC, *Primary Examiner.*

E. L. STOLARUN, *Assistant Examiner.*